United States Patent
Huang et al.

(10) Patent No.: US 9,300,698 B2
(45) Date of Patent: Mar. 29, 2016

(54) SYSTEM AND METHOD FOR DESKTOP CONTENT SHARING

(71) Applicant: CISCO TECHNOLOGY, INC., San Jose, CA (US)

(72) Inventors: Haihua Huang, Suzhou (CN); Jun Xiao, Suzhou (CN); Yaqing Zhang, Suzhou (CN); Qi Yang, Suzhou (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 363 days.

(21) Appl. No.: 13/913,161

(22) Filed: Jun. 7, 2013

(65) Prior Publication Data

US 2014/0365568 A1 Dec. 11, 2014

(51) Int. Cl.
*G06F 15/16* (2006.01)
*H04L 29/06* (2006.01)
*H04L 29/08* (2006.01)

(52) U.S. Cl.
CPC .......... *H04L 65/1089* (2013.01); *H04L 65/403* (2013.01); *H04L 65/4015* (2013.01); *H04L 67/143* (2013.01)

(58) Field of Classification Search
None
See application file for complete search history.

(56) References Cited

U.S. PATENT DOCUMENTS

| 2010/0223345 A1* | 9/2010 | Gupta et al. | 709/206 |
| 2011/0185288 A1* | 7/2011 | Gupta et al. | 715/752 |
| 2013/0254279 A1* | 9/2013 | Bentley et al. | 709/204 |

OTHER PUBLICATIONS

U.S. Appl. No. 13/870,467, filed Apr. 25, 2013 entitled "System for Generating Meaningful Topic Labels and Improving Automatic Topic Segmentation," Inventors: Matthias Paulik, et al.

* cited by examiner

*Primary Examiner* — Brian P Whipple
(74) *Attorney, Agent, or Firm* — Patent Capital Group

(57) ABSTRACT

An example method is provided and includes determining, during a desktop sharing session of a meeting session, a content identity of a content item that is being shared, storing information indicative of the content identity in desktop sharing historical information, determining that the meeting session has ended, determining a post-meeting representation of the desktop sharing historical information, and causing display of the post meeting representation of the desktop sharing historical information.

18 Claims, 16 Drawing Sheets

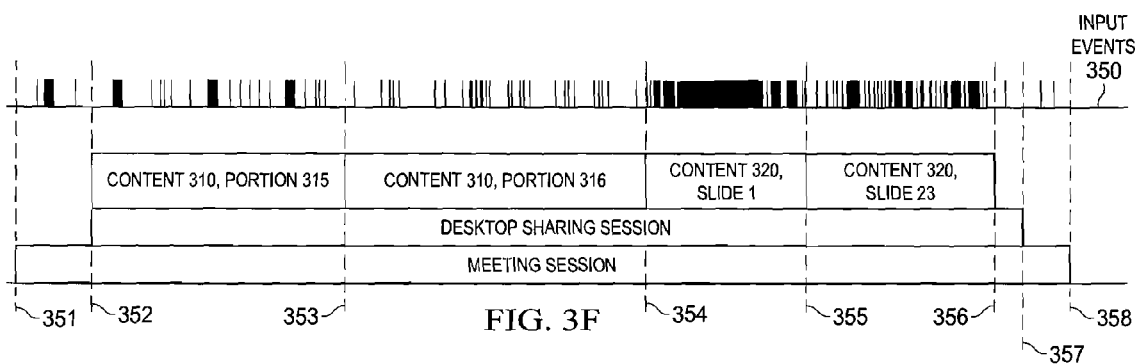
FIG. 3F
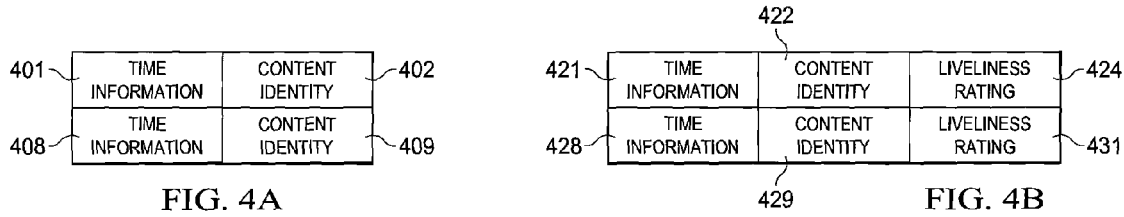
FIG. 4A
FIG. 4B

| 451 — TIME INFORMATION | CONTENT IDENTITY | PORTION INDEX | 453 |
|---|---|---|---|
| 455 — TIME INFORMATION | CONTENT IDENTITY | PORTION INDEX | 456 |
| 458 — TIME INFORMATION | CONTENT IDENTITY | PORTION INDEX | 460 |
| 462 — TIME INFORMATION | CONTENT IDENTITY | PORTION INDEX | 463 |

| 481 — TIME INFORMATION | CONTENT IDENTITY | PORTION INDEX | LIVELINESS RATING | 484 |
|---|---|---|---|---|
| 485 — TIME INFORMATION | CONTENT IDENTITY | PORTION INDEX | LIVELINESS RATING | 487 |
| 488 — TIME INFORMATION | CONTENT IDENTITY | PORTION INDEX | LIVELINESS RATING | 491 |
| 492 — TIME INFORMATION | CONTENT IDENTITY | PORTION INDEX | LIVELINESS RATING | 494 |

| | |
|---|---|
| MEETING SESSION START | TIME 351 |
| SHARE DESKTOP START | TIME 352 |
| SHARE DESKTOP END | TIME 357 |
| MEETING SESSION END | TIME 358 |

FIG. 5A

| | |
|---|---|
| MEETING SESSION START | TIME 351 |
| SHARE DESKTOP START | TIME 352 |
| SHOW CONTENT 310 | TIME 352 |
| SHOW CONTENT 320 | TIME 354 |
| SHARE DESKTOP END | TIME 357 |
| MEETING SESSION END | TIME 358 |

FIG. 5B

| | |
|---|---|
| MEETING SESSION START | TIME 351 |
| SHARE DESKTOP START | TIME 352 |
| SHOW CONTENT 310 | TIME 352 |
|    TURN TO PORTION 315 | TIME 352 |
|    TURN TO PORTION 316 | TIME 353 |
| SHOW CONTENT 320 | TIME 354 |
|    TURN TO SLIDE 1 | TIME 354 |
|    TURN TO SLIDE 23 | TIME 355 |
| SHARE DESKTOP END | TIME 357 |
| MEETING SESSION END | TIME 358 |

FIG. 5C

SYSTEM AND METHOD FOR DESKTOP CONTENT SHARING

TECHNICAL FIELD

This disclosure relates in general to the field of communications and, more particularly, to desktop content sharing.

BACKGROUND

In certain architectures, service providers and/or enterprises may seek to offer sophisticated online conferencing services for their end users. The conferencing architecture may offer an "in-person" meeting experience over a network. Conferencing architectures may also deliver real-time interactions between people using advanced visual, audio, and multimedia technologies. Virtual meetings and conferences have an appeal because they may be held without the associated travel inconveniences and costs. In addition, virtual meetings may provide a sense of community to participants who are dispersed geographically. There are new interactive paradigms that have emerged that differ from face-to-face interactions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 3A-3F are illustrations relating to shared content associated with a desktop sharing session associated with a meeting client program according to at least one example embodiment;

FIGS. 4A-4D are diagrams illustrating desktop sharing historical information according to at least one example embodiment;

FIGS. 5A-5C are diagrams illustrating tables of contents associated with a meeting session according to at least one example embodiment;

DETAILED DESCRIPTION OF EXAMPLE EMBODIMENTS

Overview

One or more embodiments may provide an apparatus, a method, a computer readable medium, a non-transitory computer readable medium, a computer program product, and/or the like, to determining, during a desktop sharing session of a meeting session, a content identity of a content item that is being shared, storing information indicative of the content identity in desktop sharing historical information, determining that the meeting session has ended, determining a post-meeting representation of the desktop sharing historical information, and causing display of the post meeting representation of the desktop sharing historical information.

One or more embodiments may provide an apparatus, a method, a computer readable medium, a non-transitory computer readable medium, a computer program product, and/or the like, comprising means for determining, during a desktop sharing session of a meeting session, a content identity of a content item that is being shared, means for storing information indicative of the content identity in desktop sharing historical information, means for determining that the meeting session has ended, means for determining a post-meeting representation of the desktop sharing historical information, and means for causing display of the post meeting representation of the desktop sharing historical information.

Example Embodiments

Figure 1:
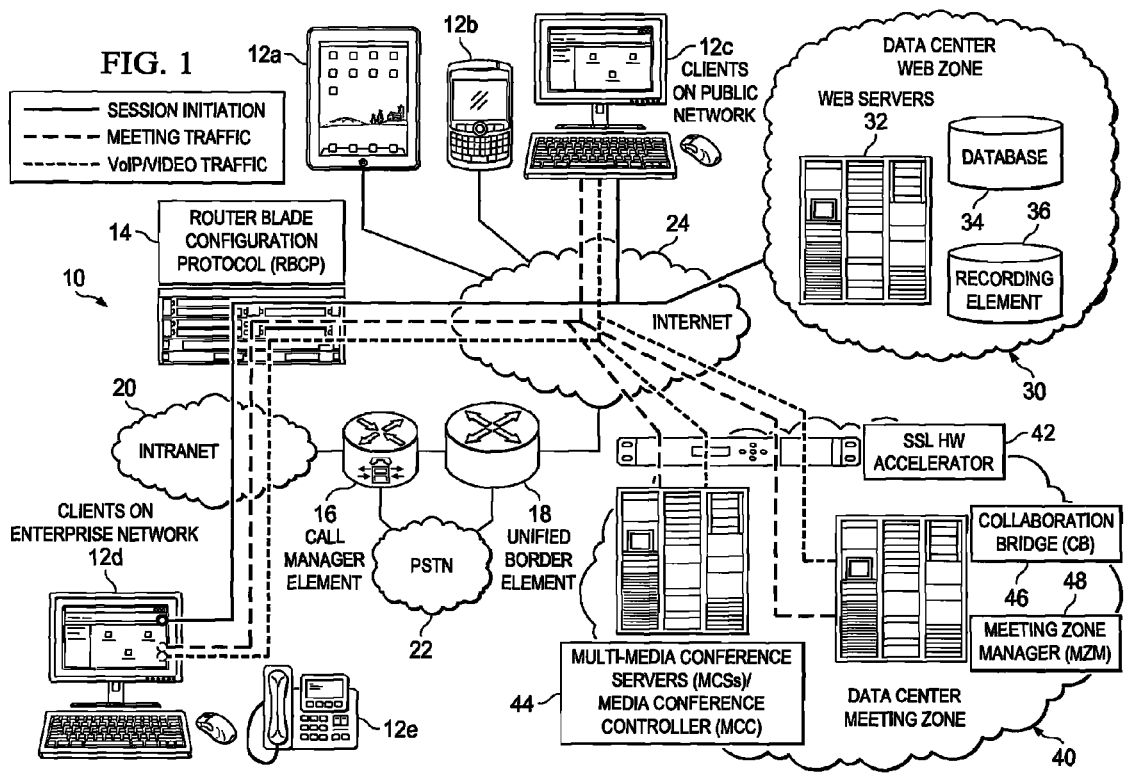
FIG. 1 is a simplified schematic diagram of a communication system for managing a conversation in accordance with at least one example embodiment.

FIG. 1 is a simplified schematic diagram of a communication system 10 for managing a conversation in accordance with at least one example embodiment. Communication system 10 may include a number of endpoints 12a-e that may achieve suitable network connectivity via various points of attachment. In the example of FIG. 1, communication system 10 includes an Intranet 20, a public switched telephone network (PSTN) 22, and an Internet 24, which (in this particular example) offers a pathway to a data center web zone 30 and a data center meeting zone 40.

Data center web zone 30 includes a plurality of web servers 32, a database 34, and a recording element 36. Data center meeting zone 40 includes a secure sockets layer hardware (SSL HW) accelerator 42, a plurality of multimedia conference servers (MCSs)/media conference controller (MCC) 44, a collaboration bridge 46, and a meeting zone manager 48. In at least one example embodiment, each MCS may be configured to coordinate video and voice traffic for a given online meeting. Additionally, each MCC may be configured to manage the MCS from data center meeting zone 40.

Various types of routers and switches may be used to facilitate communications amongst any of the elements of FIG. 1. For example, a call manager element 16 and a unified border element 18 may be provisioned between PSTN 22 and Intranet 20. Also depicted in FIG. 1 are a number of pathways (e.g., shown as solid or broken lines) between the elements for propagating meeting traffic, session initiation, and voice over Internet protocol (VoIP)/video traffic.

Figure 2:
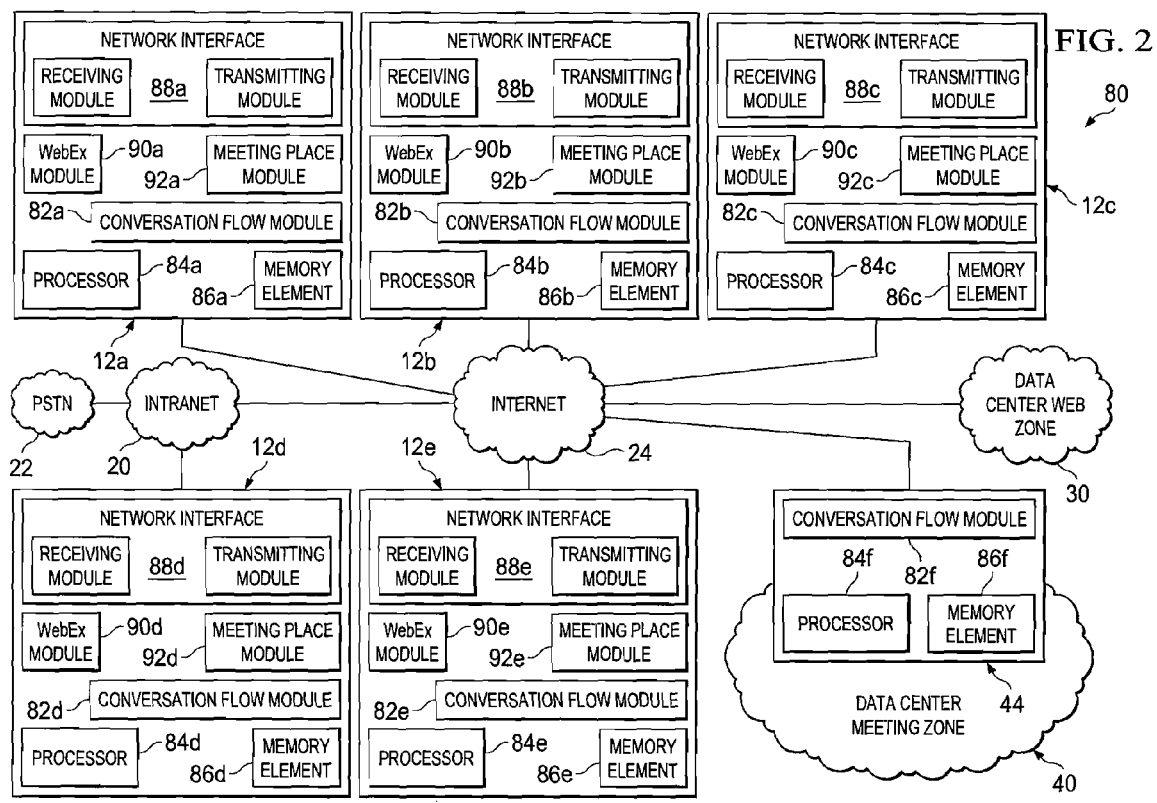
FIG. 2 is a simplified schematic diagram illustrating possible details related to an example infrastructure of a communication system in accordance with at least one example embodiment.

FIG. 2 is a simplified schematic diagram illustrating possible details related to an example infrastructure of a communication system 10 in accordance with at least one example embodiment. Each of endpoints 12a-e are provisioned with a respective conversation flow module 82a-e, a respective processor 84a-e, a respective memory element 86a-e, a respective WebEx module 90a-e, a respective Meeting Place module 92a-e, and a respective network interface 88a-e, which includes a respective receiving module and a respective transmitting module for exchanging data (e.g., for exchanging packets in a network environment). FIG. 2 illustrates an example implementation of MCSs/MCC 44 that is similarly provisioned with a conversation flow module 82f, a processor 84f, and a memory element 86f.

In at least one example embodiment, each endpoint 12a-e and/or MCSs/MCC 44 includes software (e.g., as part of conversation flow modules 82a-f) to achieve or to support managing a conversation, as outlined herein in this document. In other embodiments, this feature may be provided externally to any of the aforementioned elements, or included in some other network element to achieve this functionality. Alternatively, several elements may include software (or reciprocating software) that may coordinate in order to achieve the operations, as outlined herein. In still other embodiments, any of the devices of the FIGURES may include any suitable algorithms, hardware, software, components, modules, interfaces, or objects that facilitate in managing a conversation.

It is imperative to note that FIG. 2 is indicative of just one, of the multitude, of example implementations of communication system 10. Any of the modules or elements within endpoints 12a-e and/or MCSs/MCC 44 may readily be replaced, substituted, or eliminated based on particular needs. Furthermore, although described with reference to particular scenarios, where a given module (e.g., WebEx module 90a-e, Meeting Place module 92a-e, conversation flow module 82a-e, etc.) is provided within endpoints 12a-e or MCSs/MCC 44, any one or more of these elements may be provided externally, or consolidated and/or combined in any suitable fashion. In certain instances, certain elements may be provided in a single proprietary module, device, unit, etc. in order to achieve the teachings of the present disclosure.

Endpoints 12a-e are representative of any type of client or user wishing to participate in a meeting session in communication system 10 (e.g., or in any other online platform). Furthermore, endpoints 12a-e may be associated with individuals, clients, customers, or end users wishing to participate in a meeting session in communication system 10 via some network. The term 'endpoint' is inclusive of devices used to initiate a communication, such as a computer, a personal digital assistant (PDA), a laptop or electronic notebook, a cellular telephone of any kind, an iPhone, an IP phone, a Blackberry, a Google Droid, an iPad, a tablet, or any other device, component, element, or object capable of initiating voice, audio, video, media, or data exchanges within communication system 10. Endpoints 12a-e may also be inclusive of a suitable interface to the human user, such as a microphone, a display, or a keyboard or other terminal equipment. Endpoints 12a-e may also be any device that seeks to initiate a communication on behalf of another entity or element, such as a program, a proprietary conferencing device, a database, or any other component, device, element, or object capable of initiating an exchange within communication system 10. Data, as used herein in this document, refers to any type of numeric, voice, video, media, or script data, or any type of source or object code, or any other suitable information in any appropriate format that may be communicated from one point to another.

MCSs/MCC 44 and web servers 32 are network elements that manage (or that cooperate with each other in order to manage) aspects of a meeting session. As used herein in this Specification, the term 'network element' is meant to encompass any type of servers (e.g., a video server, a web server, etc.), routers, switches, gateways, bridges, loadbalancers, firewalls, inline service nodes, proxies, network appliances, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. In one particular example, MCSs/MCC 44 and web servers 32 are servers that may interact with each other via the networks of FIG. 1.

Intranet 20, PSTN 22, and Internet 24 represent a series of points or nodes of interconnected communication paths for receiving and transmitting packets of information that propagate through communication system 10. These networks may offer connectivity to any of the devices or endpoints of FIG. 1. Moreover, Intranet 20, PSTN 22, and Internet 24 offer a communicative interface between sites (and/or participants, rooms, etc.) and may be any local area network (LAN), wireless LAN (WLAN), metropolitan area network (MAN), wide area network (WAN), extranet, Intranet, virtual private network (VPN), virtual LAN (VLAN), or any other appropriate architecture or system that facilitates communications in a network environment.

Intranet 20, PSTN 22, and Internet 24 may support a transmission control protocol (TCP)/IP, or a user datagram protocol (UDP)/IP in particular embodiments of the present disclosure; however, Intranet 20, PSTN 22, and Internet 24 may alternatively implement any other suitable communication protocol for transmitting and receiving data packets within communication system 10. Note also that Intranet 20, PSTN 22, and Internet 24 may accommodate any number of ancillary activities, which may accompany a meeting session. This network connectivity may facilitate all informational exchanges (e.g., notes, virtual whiteboards, PowerPoint presentations, e-mailing, word-processing applications, etc.). Along similar reasoning, Intranet 20, PSTN 22, and Internet 24 may foster all such communications and, further, be replaced by any suitable network components for facilitating the propagation of data between participants in a conferencing session.

It should also be noted that endpoints 12a-e and MCSs/MCC 44 may share (or coordinate) certain processing operations. Using a similar rationale, their respective memory elements may store, maintain, and/or update data in any number of possible manners. Additionally, any of the illustrated memory elements or processors may be removed, or otherwise consolidated such that a single processor and a single memory location is responsible for certain activities associated with managing a conversation. In a general sense, the arrangement depicted in FIG. 2 may be more logical in its representations, whereas a physical architecture may include various permutations/combinations/hybrids of these elements.

Figure 7:
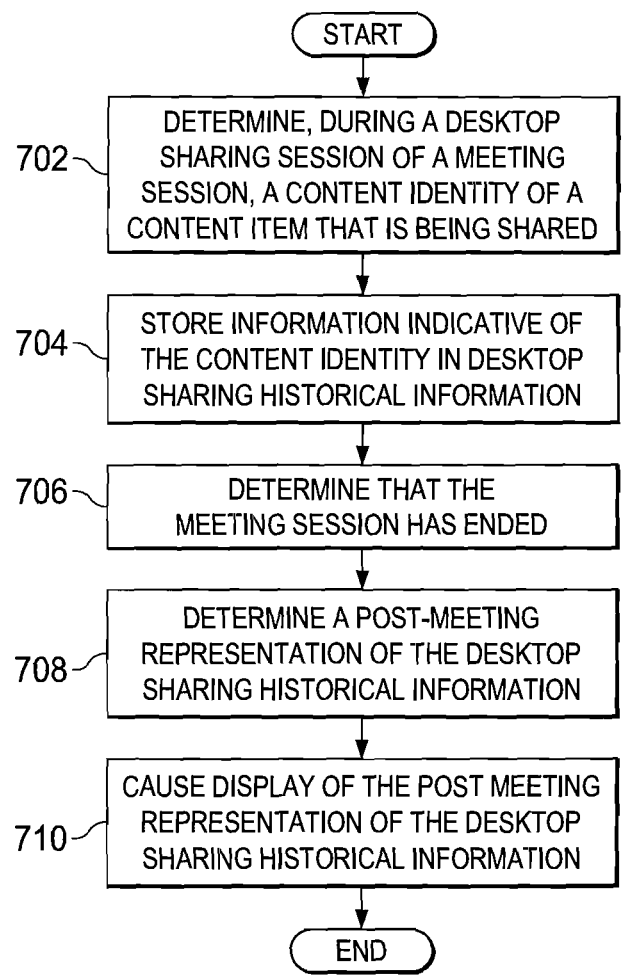
FIG. 7 is a flow diagram illustrating activities associated with desktop sharing historical information according to at least one example embodiment.

Note that in certain example embodiments, the conversation management functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 7) may store data used for the operations described herein. This includes the memory element being able to store software, logic, code, or processor instructions that may be executed to carry out the activities described in this Specification. A processor may execute any type of instructions associated with the data to achieve the operations detailed herein in this Specification. In one example, the processor (as shown in FIG. 7) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, conversation flow modules 82a-f include software in order to achieve the conversation management functions outlined herein. These activities may be facilitated by MCSs/MCC 44 and/or the various endpoints 12a-f. MCSs/MCC 44 and/or endpoints 12a-f may include memory elements for storing information to be used in managing a conversation, as outlined herein. Additionally, MCSs/MCC 44 and/or endpoints 12a-f may include a processor that may execute software or an algorithm to perform management of a conversation, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

FIGS. 3A-3F are illustrations relating to shared content associated with a desktop sharing session associated with a meeting client program according to at least one example embodiment. The examples of FIGS. 3A-3F are merely examples and do not limit the claims in any way. For example, the representation of the meeting client program may vary, the information represented may vary, the format may vary, position of representations may vary, number of content items may vary, number of portions of content items may vary, interrelationship of content items may vary, and/or the like.

One of the benefits that users enjoy during a meeting session is the ability to share content with each other. For example, a user may share one or more content items with other meeting participants during the meeting session. In this manner, the content item may enhance the productivity of the meeting, the meeting may enhance the perception of the content item, and/or the like. A content item may relate to content such as a document, a video, an image, audio information, and/or the like. For example, a user may desire to share a presentation with meeting participants. The presentation may be a content item that comprises documentation, images, video, audio, and/or the like. In at least one example embodiment, sharing relates to causing the content to be rendered to one or more other meeting session attendees as part of the meeting session. In at least one example embodiment, an apparatus may allow a user to share content by way of selecting an application to share, sharing the user's desktop, and/or the like. For example, when sharing an application, the content of the shared application may be provided to meeting session attendees, while content of other applications that may be in operation may be unrepresented in the meeting session. In another example, when sharing the user's desktop, content of applications that are visible in the user's desktop area may be provided to meeting attendees without regard for an application that may be providing the content. In such an example, the desktop sharing session may relate to a desktop region to be shared such that applications presented within the desktop region are shared. In this manner, sharing the user's desktop may allow sharing of content that may be associated with a plurality of applications. For example, the content shared from a user's desktop may relate to a document of a document editor application, a presentation of a presentation viewer application, an image of an image editor, and/or the like, provided together as represented on the user's desktop. In this manner, the desktop sharing session is independent of any application sharing session that may or may not have been active.

In at least one example embodiment, a desktop sharing session relates to a period of a meeting session in which a user is sharing his desktop. For example, a desktop sharing session may begin when a user performs an input indicative of a desire to share his desktop in the meeting session. Such a desktop sharing session may end when the user performs an input indicative of a desire to end the sharing of his desktop.

Figure 3A:
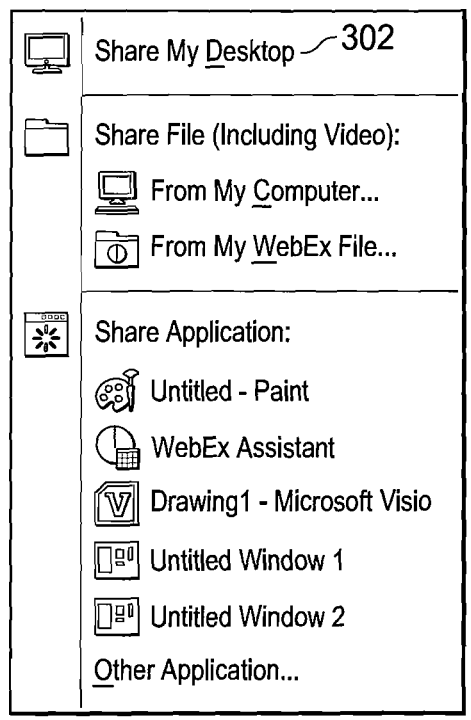

FIG. 3A illustrates a menu associated with a desktop sharing session. It can be seen that the menu provides menu element 302, which relates to a memory element that allows the user to share the user's desktop. In the example of FIGS. 3A, there are many other menu elements that allow the user to select an application for sharing content. For example, the user may select content or an application that is not currently running on the desktop, may select from a list of applications running on the desktop, and/or the like.

In some circumstances, it may be desirable to track content that is shared in a meeting. In this manner, there may be a post-meeting representation of the content, such as a list, a chronology, and/or the like. For example, it may be desirable to have a table of contents that reflect the information conveyed in the meeting session, the activities of the meeting session, and/or the like, similar as described regarding FIGS. 5A-5C. In some circumstances, it may be desirable to upload content that was shared in the meeting. For example, other users may desire to download content that was shared in the meeting at some time after the meeting has ended. In such circumstances, it may be desirable to simplify the process of the user selecting content to be uploaded, similarly as described regarding FIGS. 6A-6B.

In some circumstances, identification of content during a desktop sharing session may be substantially different from identification of content during an application sharing session. For example, the unitary nature of the application sharing session allows for straight-forward content determination. In another example, the ability to share multiple applications in a desktop sharing mode may relate to a more elaborate content determination.

In some circumstances, a user may desire to share content by way of a desktop sharing session instead of an application sharing session so that the user may transition between multiple applications for sharing multiple content items. For example, the use may desire to share seven different documents. In such an example, the user may desire to utilize the desktop sharing session to avoid distinctly designating each of the seven content items to be shared. For example, by utilizing the desktop sharing session, the user may transition sharing from content item to content item by way of shifting focus to the content item on the user's desktop.

Figure 3B:
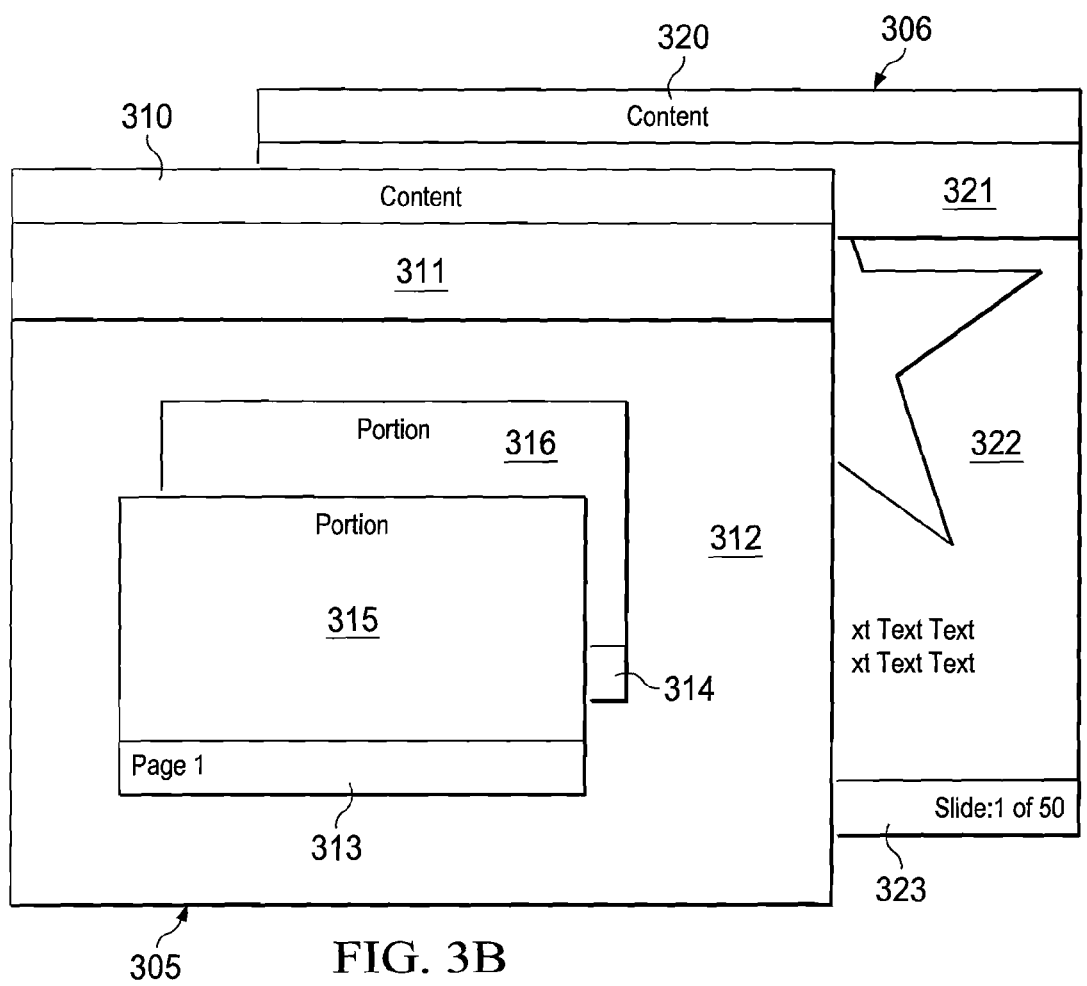

FIG. 3B illustrates content items associated with a desktop sharing session. In the example of FIG. 3B, the desktop comprises application 305, which relates to content 310, and application 306, which relates to content 320. It can be seen that application 305 comprises a header that comprises a representation of the content identity. In at least one example embodiment, the content identity relates to at least one of a file name or a title. The representation of the content identity may be any representation that allows a user to understand the identity of the content. For example, the header of application 305 comprises text indicative of content 310 and the header of application 306 comprises text indicative of content 320. In some circumstances, the header may comprises information other than a representation of the content of the application, such as a representation of the application identity, a representation of one or more operations of the application, and/or the like.

In some circumstances, the application may comprise one or more regions that are allocated for a purpose other than presentation of content. In at least one example embodiment, such a region is referred to as a content independent region. For example, there may be menus, icons, and/or the like, associated with performing actions with the application. In the example of FIG. 3B, application 305 comprises content independent region 311 and application 306 comprises content independent region 321.

In some circumstances, the application may comprise a region that is, at least partially, dedicated to presentation of content. For example, there may be a content editing region, a content viewing region, and/or the like. In at least one example embodiment, such a region is referred to as a content region. In the example of FIG. 3B, application 305 comprises content region 312, and application 306 comprises content region 322.

In some circumstances, the application may provide for presentation of multiple portions of the content. In at least one example embodiment, a portion of a content item relates to a portion of the content item that is less than the entirety of the content item. In at least one example embodiment, there may be a portion index that identifies a portion of the content item. For example, the portion index may relate to a page number, a section designation, a video frame, a position, and/or the like. In such an example, a section designation may relate to a chapter designation, a sub-chapter designation, a video frame designation, and/or the like. In the example of FIG. 3B, content region 312 is presenting portion 315 and portion 316.

In some circumstances, the application may comprise a footer. The footer may comprise information indicative of the content, such as information indicative of a portion index of the content item that is being presented by the application. Application 306 comprises footer 323. It can be seen that footer 323 comprises information indicative of a portion of content 320 that is being presented by application 306. For example, footer 323 indicates that slide 1 of content 320 is being presented by application 306.

In some circumstances, there may be a hierarchy of portions. For example, there may be chapters of a document and page numbers in the document. In such an example, a portion of the document may be indexed by the chapter, and a sub-portion of the chapter may be indexed by the page number. It can be seen that the window presenting portion 315 comprises footer 313, which identifies a portion index of page 1. In this manner, the window of portion 315 may be presenting page 1 of portion 315 of content 310. It can be seen that the window presenting portion 316 comprises footer 314, which identifies a portion index of page 7 (which is hidden in FIG. 3B, but visible in FIG. 3C). In this manner, the window of portion 316 may be presenting page 7 of portion 316 of content 310.

As previously described, the desktop sharing session allow a user to freely transition content items that are being shared by merely changing what is presented on the user's desktop. In this manner, the user may avoid distinct designation, in the meeting session interface, of each content item to be shared. However, such lack of designation may cause the apparatus to rely on other factors to determine which content items have been shared. For example, a common paradigm that users utilize when sharing content in a desktop sharing session is that, when the user desires to share content, the user causes the application presenting the content to receive focus. In at least one example embodiment, focus relates to a program associated with the shared content being designated to receive input by the user. In this manner, the desktop region may encompass a plurality of shared content such that a single shared content has focus. A user may designate an application to receive focus by way of an input, such as a selection of the application. In some circumstances, even if the desired content to be shared is completely unobstructed by other applications, the user may utilize the change of focus as a way to call attention of meeting attendees to the content. For example, the user may rely on the experience of the other attendees in identifying content which has focus on a desktop, so that the user does not necessarily need to expressly direct the meeting attendee's attention to the content.

In at least one example embodiment, the apparatus determines, during a desktop sharing session of a meeting session, a content identity of a content item that is being shared. The determination of the content identity may be performed absent meeting session designation of the content identity, for example, absent selection of an application sharing session associated with the content item. In at least one example embodiment, determination of the content identity comprises determination of which application of the desktop sharing session has focus. For example, the apparatus may receive an indication from an operating system indicative of which application has focus, may perform image processing to identify a visual cue indicative of the application that has focus, and/or the like.

Upon determining the application that has focus, the apparatus may determine a content identity of content that is being presented by the application. For example, determination of the content identity may comprise performance of image processing to identify a graphical representation of the content identity. For example, the apparatus may identify a header of the application, such as the header of application 305. In such an example, the apparatus may evaluate information presented by the header to identify the content identity. For example, the apparatus may parse text comprised in the header to remove information that is not indicative of a content identity, such as an application identity. In another example, determination of the content identity comprises a query to an interface to retrieve the content identity. For example, there may be an operating system interface, a program interface, a library interface, and/or the like, that allows the apparatus to receive information indicative of the content item being presented by the application that has focus.

Upon determining the content identity of the content item that is being presented by the application, the apparatus may determine a portion index of the content item. For example, determination of the portion index may comprise performance of image processing to identify a graphical representation of the portion index. For example, the apparatus may identify a footer of the application, such as the footer of application 306. In such an example, the apparatus may evaluate information presented by the footer to identify the portion index. For example, the apparatus may parse text comprised in the footer to remove information that is not indicative of a content identity, such as an application control elements. In another example, determination of the content identity comprises a query to an interface to retrieve the portion index. For example, there may be an operating system interface, a program interface, a library interface, and/or the like, that allows the apparatus to receive information indicative of the portion index of the content item being presented by the application that has focus.

Figure 3C:
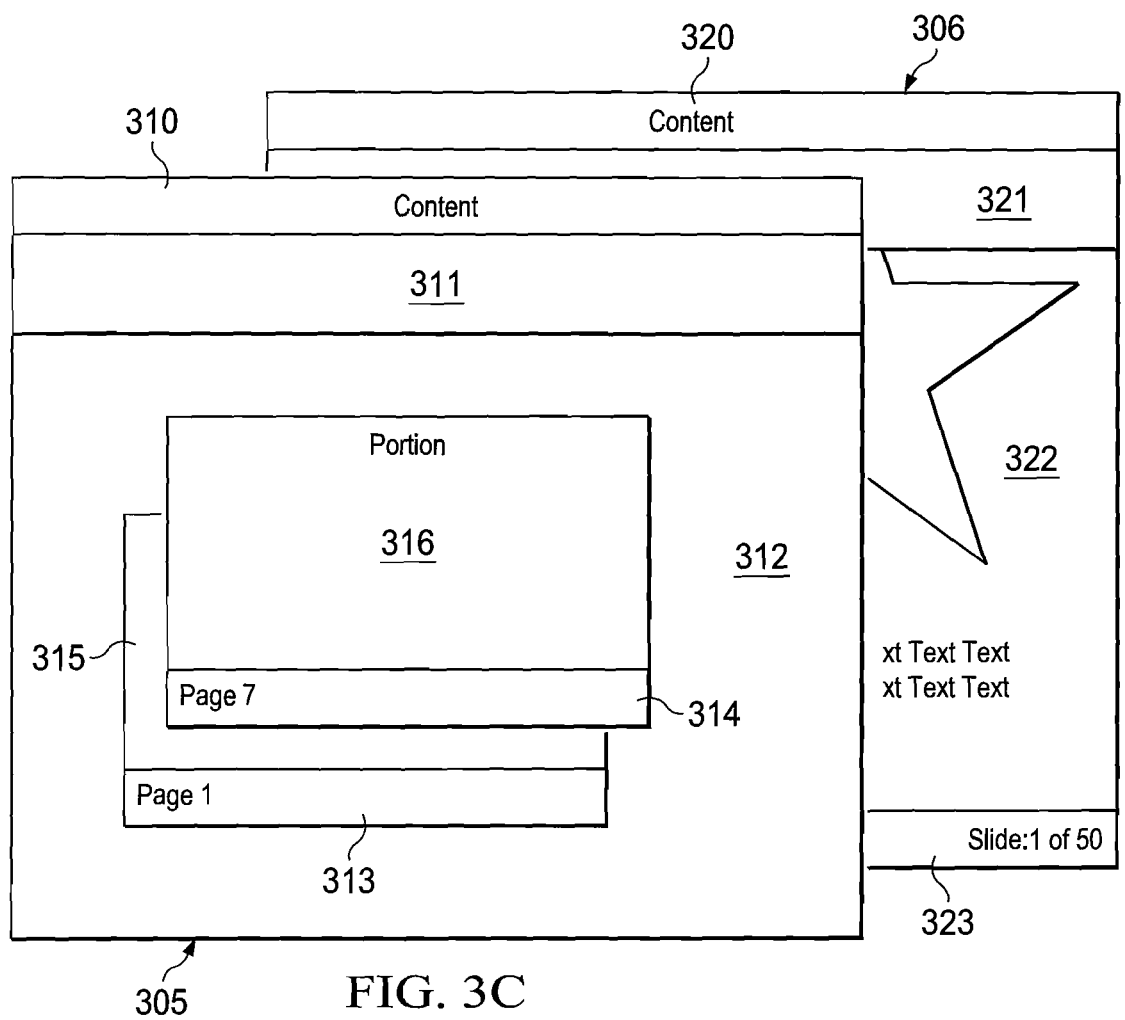

FIG. 3C illustrates content items associated with a desktop sharing session. In the example of FIG. 3C portion 316 of content 310 has received focus so that application 305 is providing content 310 at portion index 316. In at least one example embodiment, the apparatus may determine that the portion being provided has changed, and may determine a different portion index. For example, the apparatus may determine that portion index 315 no longer has focus, and that portion index 316 has received focus.

Figure 3D:
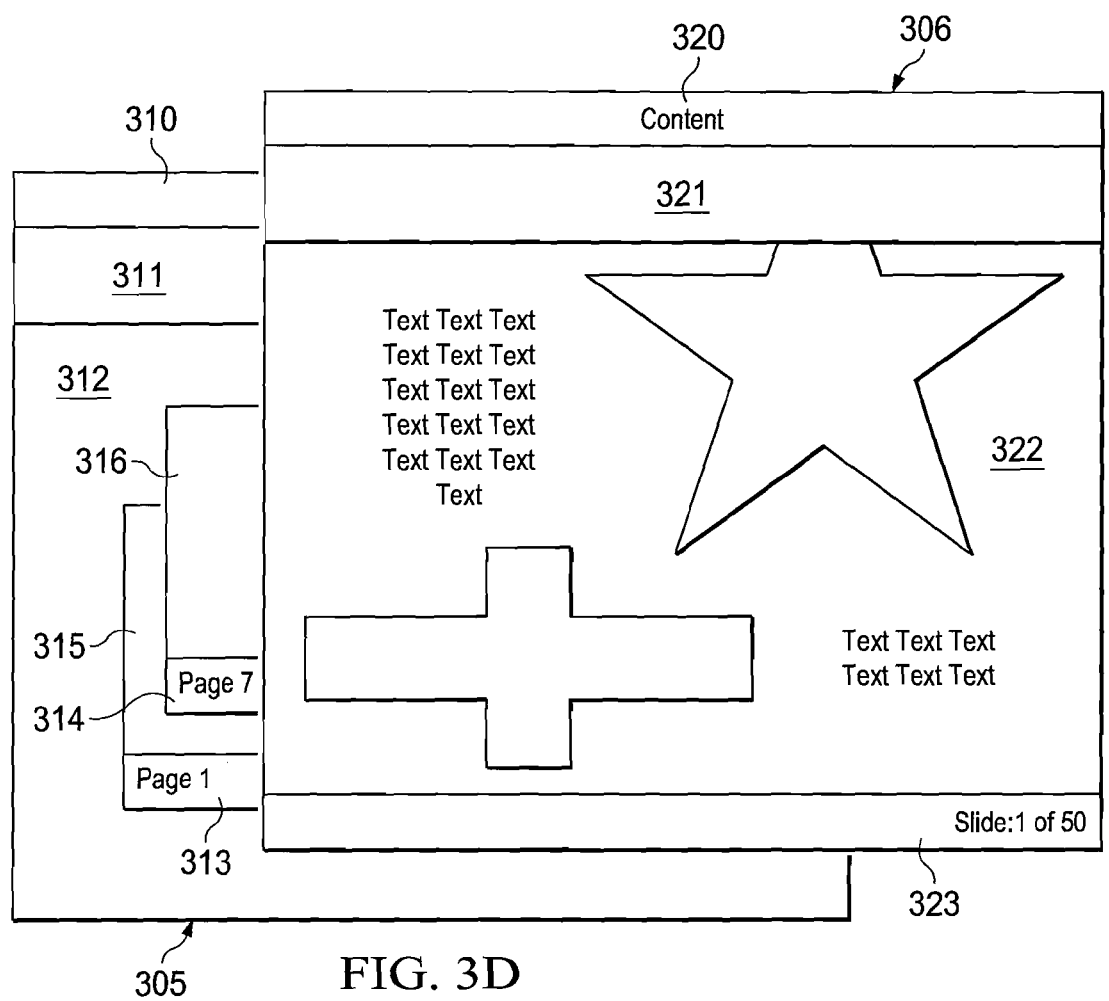

FIG. 3D illustrates content items associated with a desktop sharing session. In the example of FIG. 3C application 306 has received focus. In this manner, content 320 is being provided. It can be seen that the portion of content 320 being provided by application 306 relates to slide 1 of content 320. In this manner, content 320 is being provided at a portion index of slide 1.

Figure 3E:
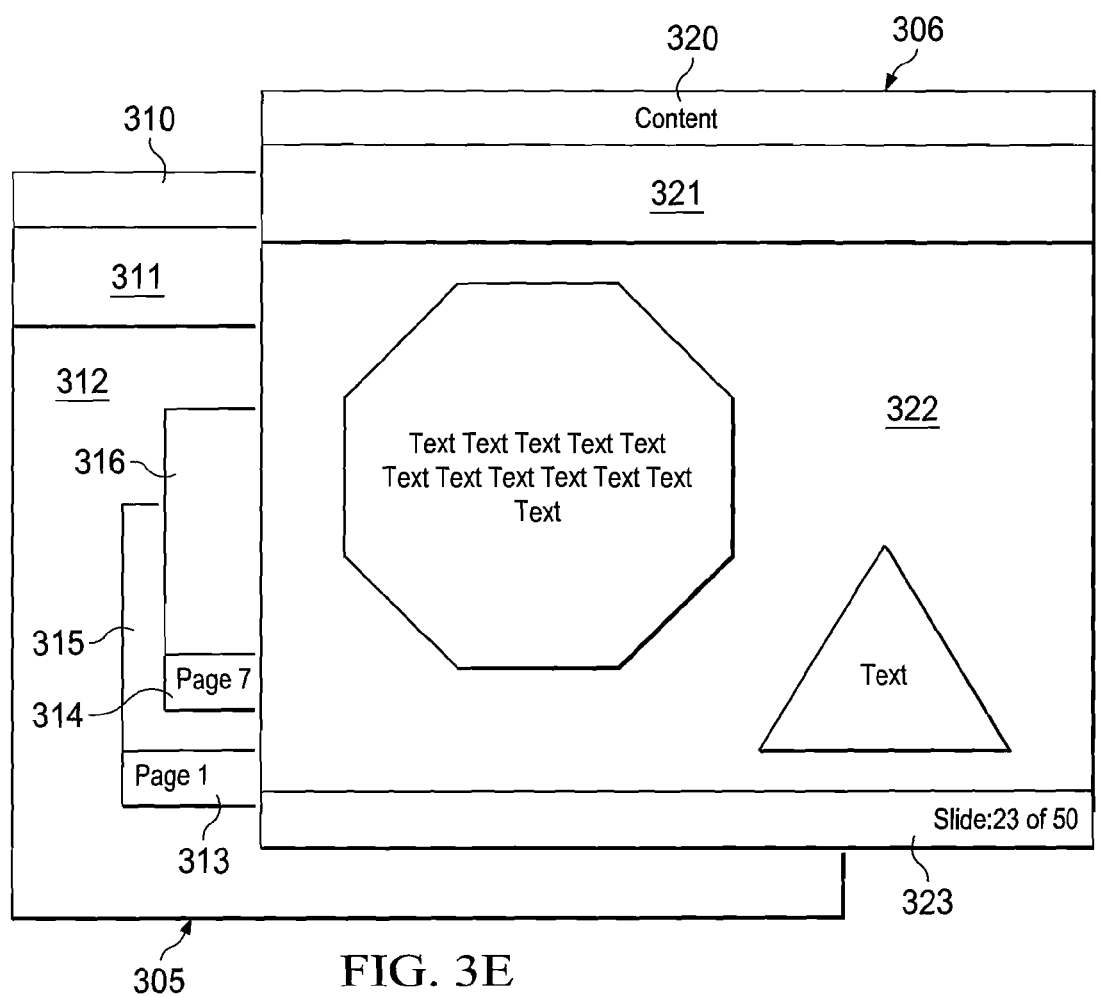

FIG. 3E illustrates content items associated with a desktop sharing session. In the example of FIG. 3C application 306 retains focus, but has changed the portion of the content item provided. In this manner, slide 23 of content 320 is being provided. In such an example, the user may have scrolled to slide 23, may have directly indexed slide 23, and/or the like. In this manner, content 320 is being provided at a portion index of slide 23.

FIG. 3F is a timing diagram illustrating time information associated with a desktop sharing session. As previously mentioned, as a user changes the content and/or the portion of content being provided in a meeting session, it may be desirable to keep track of content and/or portions of the content that are being provided. It may also be desirable to determine time information associated with content being provided in the meeting session. In at least one example embodiment, time information relates to at least one of a sharing start time, a sharing duration, or a sharing end time. For example, time information associated with a content item may indicate a time at which the sharing of the content item started, a time at which the sharing of the content item ended, a duration of which the sharing of the content item was shared, and/or the like. In at least one example embodiment, the apparatus may determine the time information. For example, the apparatus may determine the time information when a change occurs in the content item being provided, the portion of the content item being provided, and/or the like.

In some circumstances, some content items that are provided during a meeting session are more important to the conversation of the meeting session than other content items. In such circumstances, the importance of the content item may be related to the amount of input that the user sharing the content item performs with regards to the content item during sharing. For example, there may be a content item provided in a meeting session in which the user sharing the content item is performing a large amount of scrolling, clicking, pointing etc. Such input may be indicative of active conversation regarding the content item. In another example, the user may provide a different content item in a meeting session in which the user sharing the content item is performing a small amount of scrolling. In such an example, the apparatus may infer that the lesser input activity associated with the other content item is indicative of the content item being more important than the other content item.

In at least one example embodiment, the apparatus determines a liveliness rating associated with a content item. In at least one example embodiment, a liveliness rating relates to a measurement of amount of user input events during sharing of the content item in relation to the shared content item. In at least one example embodiment, a user input event relates to a click event, a scroll event, a cursor movement event, a keystroke event, and/or the like. The liveliness rating may take into account the number of input events and the type of input events. In at least one example embodiment, the liveliness rating relates to a summation of weighted values associated each user input event. For example, the liveliness rating, $L_R$ of a content item, or a portion of a content item, may be calculated as:

$$L_R = \sum_{i=1}^{n} L_i$$

where n relates to the number of user input events associated with the content item or the portion of the content item, and $L_i$ relates to a weighted value for a specific user input event, such as a click, a scroll, a movement, etc.

The example of FIG. 3F relates to a desktop sharing session associated with the examples of FIGS. 3B-3E. The timing diagram of FIG. 3F illustrates sharing of content items, portions of content items, and user input events 350 in relation to a desktop sharing session and a meeting session. It can be seen that the meeting session starts at time 351 and ends at time 358. In the example of FIG. 3F, the desktop sharing session starts and time 352 and ends at time 357. During the desktop sharing session, content 310 starts being shared at time 352 and sharing of content 310 ends at time 354. It can be seen that portion 315 of content 310 is shared from time 352 to time 353, and that portion 316 of content 310 is shared from time 353 to time 354. During the desktop sharing session, content 320 starts being shared at time 354 and sharing of content 320 ends at time 356. It can be seen that portion 1 of content 320 is shared from time 354 to time 355, and that portion 23 of content 320 is shared from time 355 to time 356.

In at least one example embodiment, the input events that occur during a time period in which a content item is being shared may be attributable to the content item. In at least one example embodiment, the input events that occur during a time period in which a portion of a content item is being shared may be attributable to the portion of the content item. It can be seen that there is a larger amount of user input events during sharing of content 320 compared to the sharing of content 310. In this manner, the liveliness rating of content 320 may be greater than the liveliness rating of content 310. In addition, it can be seen that there is a larger amount of user input events during sharing of portion index 1 of content 320 compared to the sharing of portion index 23 of content 320. In this manner, the liveliness rating of portion index 1 of content 320 may be greater than the liveliness rating of portion index 23 of content 320.

FIGS. 4A-4D are diagrams illustrating desktop sharing historical information according to at least one example embodiment. The examples of FIGS. 4A-4D are merely examples and do not limit the claims in any way. For example, number of entries may vary, information represented may vary, format may vary, interrelationship between entries may vary, number of content items may vary, number of portions of content items may vary, interrelationship of content items may vary, and/or the like.

As previously mentioned, as a user changes the content and/or the portion of content being provided in a meeting session, it may be desirable to keep track of content and/or portions of the content that are being provided. In at least one example embodiment, the apparatus utilizes desktop sharing historical information to track sharing of content items, time information associated with sharing of the content item, sharing of a portion of a content item, timing information associated with the portion of the content item, liveliness rating associated with a content item, liveliness rating associated with a portion of the content item, and/or the like. The desktop sharing historical information may be a data structure that correlates a content identity with one or more aspects of the sharing of the content indicated by the content identity.

In at least one example embodiment, the apparatus may store information associated with sharing of the content item in the desktop sharing historical information. For example, storing may comprise sending information to a repository, placing the information in a data structure, writing the information to memory, and/or the like. For example, the apparatus may store information indicative of the content identity in the desktop sharing historical information, may store time information in the desktop sharing historical information, may store the portion index in the desktop sharing historical information, may store the liveliness rating in the desktop sharing historical information, and/or the like.

As previously described, there may be a post-meeting representation of content that is shared during the meeting session. In this manner, the post-meeting representation of the content may be a post meeting representation of the desktop sharing historical information, such as a list, a chronology, and/or the like. For example, it may be desirable to have a table of contents that reflects the desktop sharing historical information, similar as described regarding FIGS. 5A-5C. In some circumstances, it may be desirable to upload content that was shared in the meeting. For example, other users may desire to download content that was shared in the meeting at some time after the meeting has ended. In such circumstances, it may be desirable to simplify the process of the user selecting content to be uploaded based, at least in part on the desktop sharing historical information, similarly as described regarding FIGS. 6A-6B.

FIG. 4A is a diagram illustrating desktop sharing historical information according to at least one example embodiment. In the example of FIG. 4A, information elements within a row correlate with each other. It can be seen that time information 401 correlates with content identity 402. It can be seen that time information 408 correlates with content identity 409.

FIG. 4B is a diagram illustrating desktop sharing historical information according to at least one example embodiment. In the example of FIG. 4B, information elements within a row correlate with each other. It can be seen that time information 421 correlates with content identity 422 and liveliness rating 424. It can be seen that time information 428 correlates with content identity 429 and liveliness rating 431.

FIG. 4C is a diagram illustrating desktop sharing historical information according to at least one example embodiment. In the example of FIG. 4C, information elements within a row correlate with each other. It can be seen that time information 451 correlates with content identity 452 and portion index 453. It can be seen that time information 455 correlates with content identity 452 and portion index 456. It can be seen that time information 458 correlates with content identity 459 and portion index 460. It can be seen that time information 462 correlates with content identity 459 and portion index 463.

FIG. 4D is a diagram illustrating desktop sharing historical information according to at least one example embodiment. In the example of FIG. 4D, information elements within a row correlate with each other. It can be seen that time information 481 correlates with content identity 482, portion index 483, and liveliness rating 484. It can be seen that time information 485 correlates with content identity 482, portion index 486, and liveliness rating 487. It can be seen that time information 488 correlates with content identity 489, portion index 490, and liveliness rating 491. It can be seen that time information 492 correlates with content identity 489, portion index 493, and liveliness rating 494.

FIGS. 5A-5C are diagrams illustrating tables of contents associated with a meeting session according to at least one example embodiment. The examples of FIGS. 5A-5C are merely examples and do not limit the claims in any way. For example, number of entries may vary, information represented may vary, format may vary, interrelationship between entries may vary, number of content items may vary, number of portions of content items may vary, interrelationship of content items may vary, and/or the like. Even though the examples of FIGS. 5A-5C relate to the examples illustrated in FIGS. 3A-3F and FIGS. 4A-4D, other scenarios may exist.

As previously stated, it may be desirable to provide a table of contents of a meeting. For example, the post-meeting representation of desktop sharing historical information may relate to a table of contents of the meeting. In at least one example embodiment, the table of contents relates to a chronological listing of meeting events that identify, at least part of, the historical sharing information. In at least one example embodiment, the table of contents identifies the content identity and time information indicative of a time at which the document identity was shared. In at least one example embodiment, the table of contents identifies a portion index and time information indicative of a time at which a portion of the content item indicated by the portion index was shared.

FIG. 5A is a diagram illustrating a table of contents associated with a meeting session according to at least one example embodiment. In the example of FIG. 5A, the table of contents merely indicates the start and end of the desktop sharing session without providing information indicative of the content that was shared in the desktop sharing session. In the example of FIG. 5A, the table of contents shows the meeting session start at time 351, the desktop sharing starting at time 352, the desktop sharing ending at time 357, and the meeting session ending at time 358. As previously stated, it may be desirable to provide information in the table of contents that indicates the content that was being shared in the desktop sharing session.

FIG. 5B is a diagram illustrating a table of contents associated with a meeting session according to at least one example embodiment. In the example of FIG. 5B, the table of contents shows the meeting session start at time 351, the desktop sharing starting at time 352, the desktop sharing ending at time 357, and the meeting session ending at time 358. In addition, the table of contents shows that content 310 was shared at time 352 and that content 320 was shared at time 354.

FIG. 5C is a diagram illustrating a table of contents associated with a meeting session according to at least one example embodiment. In the example of FIG. 5B, the table of contents shows the meeting session start at time 351, the desktop sharing starting at time 352, the desktop sharing ending at time 357, and the meeting session ending at time 358. In addition, the table of contents shows that content 310 was shared at time 352 and that content 320 was shared at time 354. Furthermore, the table of contents shows that portion 315 of content 310 was shared at time 352 and that portion 316 of content 310 was shared at time 353. Moreover, the table of contents shows that slide 1 of content 320 was shared at time 354 and that slide 23 of content 320 was shared at time 355.

Figure 6A:
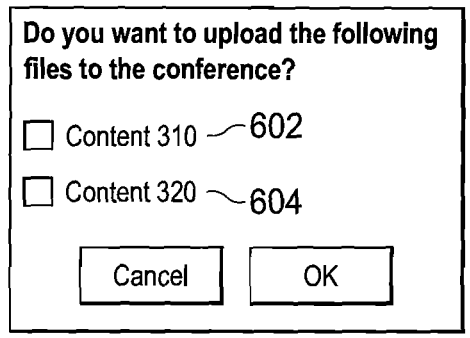
FIGS. 6A-6B are diagrams illustrating content item upload lists associated with a meeting session according to at least one example embodiment.
Figure 6B:
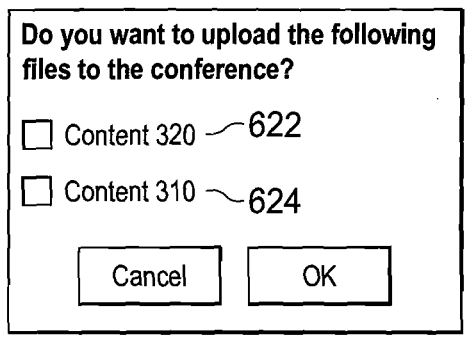

FIGS. 6A-6B are diagrams illustrating content item upload lists associated with a meeting session according to at least one example embodiment. The examples of FIGS. 6A-6B are merely examples and do not limit the claims in any way. For example, number of entries may vary, information represented may vary, format may vary, interrelationship between entries may vary, number of content items may vary, number of portions of content items may vary, interrelationship of content items may vary, and/or the like.

At previously described, in some circumstance, it may be desirable for a user to upload content that was shared in a meeting to a server after the meeting session. For example, the user may desire to allow meeting attendees, or people who were unable to attend the meeting, to retrieve content that was shared in the meeting, for example, by downloading the content from the server. As previously described, the apparatus may determine a post-meeting representation of the desktop sharing historical information that relates to a content item upload list. In at least one example embodiment, the content item upload list comprises at least one content item entry that represents a content item from the desktop historical information. For example, the representation of the content item may relate to a representation of the content identity of the desktop sharing historical information.

FIG. 6A is a diagram illustrating a content item upload list associated with a meeting session according to at least one example embodiment. In the example of FIG. 6A, a content item upload list is provided in conjunction with a dialog for performance of the upload. It can be seen that the content item upload list comprises content item entry 602, which corresponds with content 310, and content item entry 604, which corresponds with content 320.

In some circumstances, the user may determine that there was some shared content that was not heavily relied upon in the conversations of the meeting session. In such an example, the user may desire omit such content from the content item upload list. In some circumstances, it may be desirable for the apparatus to assist the user in understanding which content may have been more pertinent to the conversations of the meeting session.

In at least one example embodiment, the apparatus determines a content item priority associated with a content item entry of a content item upload list. The content item priority may be based, at least in part on a liveliness rating associated with the content item of the content item entry. The content item priority may be based, at least in part, on a duration of which the content item was shared. In at least one example embodiment, determination of the content item priority associated with the content item is based, at least in part, on a mathematical product of a duration in which the document was shared, and a liveliness rating associated with the content item. For example, the content item priority P may be:

$$P = t * \sum_{i=1}^{n} L_i$$

where t relates to the time duration that the content item or the portion of the content item was shared, n relates to the number of user input events associated with the content item or the portion of the content item, and $L_i$ relates to a weighted value for a specific user input event, such as a click, a scroll, a movement, etc. In this manner, a higher priority value may be indicative of more desirable content item for upload.

In at least one example embodiment, the content item upload list is ordered based, at least in part, on a content item priority associated with each content item entry in the content item upload list. For example, the order of the content item entries in the content item upload list may be in descending order of content item priority. Such ordering may allow the user to quickly identify which content items may be more desirable to upload based on the way the content item was shared during the meeting session.

FIG. 6B is a diagram illustrating a content item upload list associated with a meeting session according to at least one example embodiment. It can be seen that the content item upload list comprises content item entry 624, which corresponds with content 310, and content item entry 622, which corresponds with content 320. As previously described regarding FIG. 3F, the liveliness rating associated with content 320 may be greater than the liveliness rating associated with content 310. In such circumstances, the content item priority of content 320 may be higher than the content item priority of content 310. Therefore, the example of FIG. 6B may represent a content item upload list is ordered based, at least in part, on a content item priority associated with each content item entry in the content item upload list.

In some circumstances, there may be a large number of content items that are shared during a desktop sharing session. In such circumstances, it may be desirable to limit the number of content item entries presented to a user in a content item upload list. For example, it may be desirable to avoid overwhelming the user with a large number of content item entries. In such an example, it may be desirable to include a subset of the content item entries based, at least in part, on the priority of the content item entries.

In at least one example embodiment, inclusion of the content item entry in the content item down load list is indicative of the content priority associated with the content item entry being above a threshold content item priority. For example, the threshold content item priority may relate to a content item priority such that a content item entry with a priority value below the threshold is inferred to be undesirable for inclusion in the content item upload list.

In at least one example embodiment, the content item upload list comprises a predetermined number of content item entries. For example, it may be desirable for the content item upload list to contain no more than the predetermined number of content item entries. The predetermined number may be user configurable, compile-time configurable, administrator configurable, and/or the like. In at least one example embodiment, the content item entries comprised by the content item upload list relate to the highest content item priority content items that were shared in the meeting session.

FIG. 7 is a flow diagram illustrating activities associated with desktop sharing historical information according to at least one example embodiment. In at least one example embodiment, there is a set of operations that corresponds to the activities of FIG. 7. An apparatus, for example MCS/MCC 44 of FIG. 1 and FIG. 2, or a portion thereof, may utilize the set of operations. The apparatus may comprise means, including, for example processor 84f of FIG. 2, for performing such operations. In an example embodiment, an apparatus, for example MCS/MCC 44 of FIG. 1 and FIG. 2, is transformed by having memory, for example memory element 86f of FIG. 2, comprising computer code configured to, working with a processor, for example processor 84f of FIG. 2, cause the apparatus to perform set of operations of FIG. 7.

At block 702, the apparatus determines, during a desktop sharing session of a meeting session, a content identity of a content item that is being shared. The determination, the desktop sharing session, the content identity, and the content item may be similar as described regarding FIGS. 3A-3F.

At block 704, the apparatus stores information indicative of the content identity in desktop sharing historical information. The information and the desktop sharing historical information may be similar as described regarding FIGS. 3A-3F, FIGS. 4A-4D, and/or the like.

At block 706, the apparatus determines that the meeting session has ended. At block 708, the apparatus determines a post-meeting representation of the desktop sharing historical information. The determination and the post meeting representation may be similar as described regarding FIGS. 4A-4D, FIGS. 5A-5C, FIGS. 6A-6B, and/or the like.

At block 710, the apparatus causes display of the post meeting representation of the desktop sharing historical information. Causation of display may relate to any operation that causes information to be displayed. For example, causation of display may relate to displaying information, sending information to another apparatus to be displayed, and/or the like.

Figure 8:
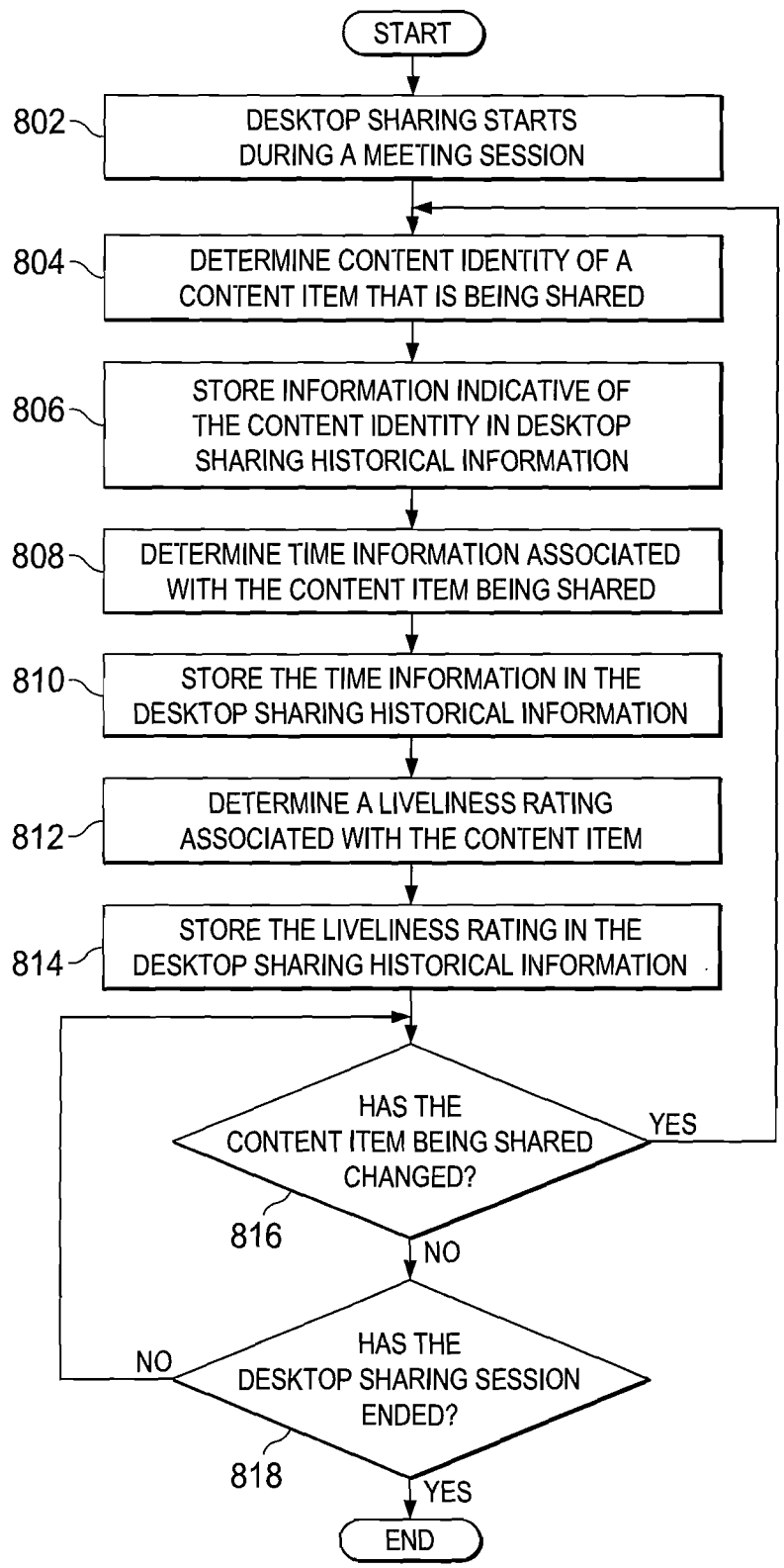
FIG. 8 is a flow diagram illustrating activities associated with desktop sharing historical information according to at least one example embodiment.

FIG. 8 is a flow diagram illustrating activities associated with desktop sharing historical information according to at least one example embodiment. In at least one example embodiment, there is a set of operations that corresponds to the activities of FIG. 8. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 8.

At block 802, the apparatus starts a desktop sharing session during a meeting session. The desktop sharing session may be similar as described regarding FIGS. 3A-3F.

At block 804, the apparatus determines a content identity of a content item that is being shared. The determination, the content identity, and the content item may be similar as described regarding FIGS. 3A-3F.

At block 806, the apparatus stores information indicative of the content identity in desktop sharing historical information, similarly as described regarding block 704 of FIG. 7.

At block 808, the apparatus determines time information associated with the content item being shared. The determination and the time information may be similar as described regarding FIGS. 3A-3F.

At block 810, the apparatus stores the time information in the desktop sharing historical information. The storage may be similar as described regarding FIGS. 4A-4D.

At block 812, the apparatus determines a liveliness rating associated with the content item. The determination and the liveliness rating may be similar as described regarding FIGS. 3A-3F.

At block 814, the apparatus stores the liveliness rating in the desktop sharing historical information. The storage may be similar as described regarding FIGS. 4A-4D.

At block 816, the apparatus determines whether the content item being shared has changed. The determination of the content item may be similar as described regarding FIGS. 3A-3F. If the apparatus determines that the content item being shared has changed, flow returns to block 804. If the apparatus determines that the content item being shared has not changed, flow proceeds to block 818.

At block 818, the apparatus determines whether the desktop sharing session has ended. If the apparatus determines that the desktop sharing session has not ended, flow returns to block 816. If the apparatus determines that the desktop sharing session has ended, flow of the example of FIG. 8 ends.

Figure 9:
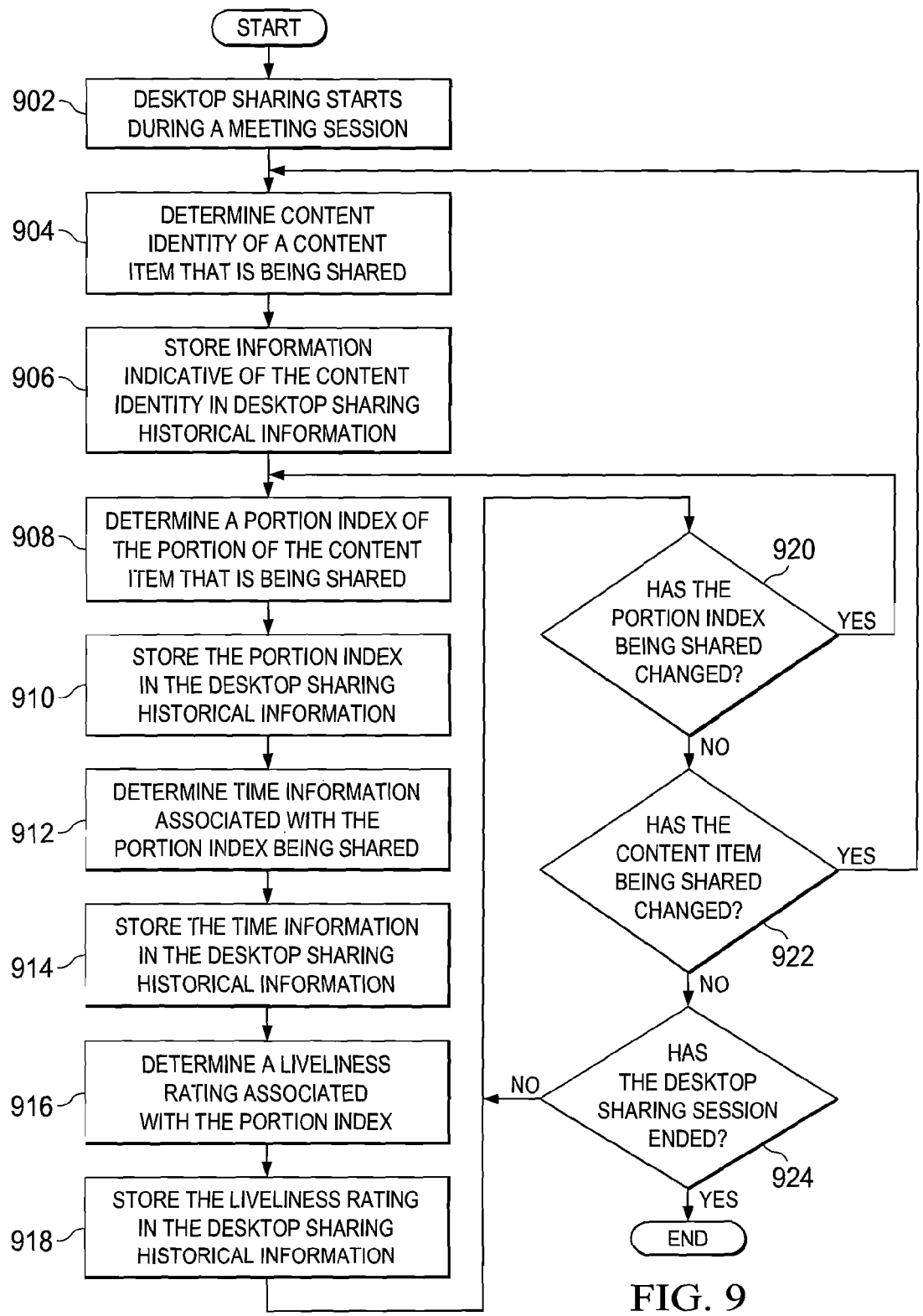
FIG. 9 is a flow diagram illustrating activities associated with desktop sharing historical information according to at least one example embodiment.

FIG. 9 is a flow diagram illustrating activities associated with desktop sharing historical information according to at least one example embodiment. In at least one example embodiment, there is a set of operations that corresponds to the activities of FIG. 9. An apparatus, for example MCS/MCC 44 of FIG. 1 and FIG. 2, or a portion thereof, may utilize the set of operations. The apparatus may comprise means, including, for example processor 84*f* of FIG. 2, for performing such operations. In an example embodiment, an apparatus, for example MCS/MCC 44 of FIG. 1 and FIG. 2, is transformed by having memory, for example memory element 86*f* of FIG. 2, comprising computer code configured to, working with a processor, for example processor 84*f* of FIG. 2, cause the apparatus to perform set of operations of FIG. 9.

At block 902, the apparatus starts a desktop sharing session during a meeting session, similarly as described regarding block 802 of FIG. 8. At block 904, the apparatus determines a content identity of a content item that is being shared, similarly as described regarding block 804 of FIG. 8. At block 906, the apparatus stores information indicative of the content identity in desktop sharing historical information, similarly as described regarding block 704 of FIG. 7.

At block 908, the apparatus determines a portion index of the portion of the content item that is being shared. The determination, the portion index, and the portion of the content item that is being shared may be similar as described regarding FIGS. 3A-3F.

At block 910, the apparatus stores the portion index in the desktop sharing historical information. The storage may be similar as described regarding FIGS. 4A-4D.

At block 912, the apparatus determines time information associated with the portion index of the content item being shared. The determination and the time information may be similar as described regarding FIGS. 3A-3F.

At block 914, the apparatus stores the time information in the desktop sharing historical information, similarly as described regarding block 810 of FIG. 8.

At block 916, the apparatus determines a liveliness rating associated with the portion index of the content item being shared. The determination and the liveliness rating may be similar as described regarding FIGS. 3A-3F.

At block 918, the apparatus stores the liveliness rating in the desktop sharing historical information, similarly as described regarding block 814 of FIG. 8.

At block 920, the apparatus whether the portion index of the content item being shared has changed. The determination of the portion index may be similar as described regarding FIGS. 3A-3F. If the apparatus determines that the portion index of the content item being shared has changed, flow returns to block 908. If the apparatus determines that the portion index of the content item being shared has not changed, flow proceeds to block 922.

At block 922, the apparatus whether the content item being shared has changed. The determination of the content item may be similar as described regarding FIGS. 3A-3F. If the apparatus determines that the content item being shared has changed, flow returns to block 904. If the apparatus determines that the content item being shared has not changed, flow proceeds to block 924.

At block 924, the apparatus determines whether the desktop sharing session has ended. If the apparatus determines that the desktop sharing session has not ended, flow returns to block 920. If the apparatus determines that the desktop sharing session has ended, flow of the example of FIG. 9 ends.

Figure 10:
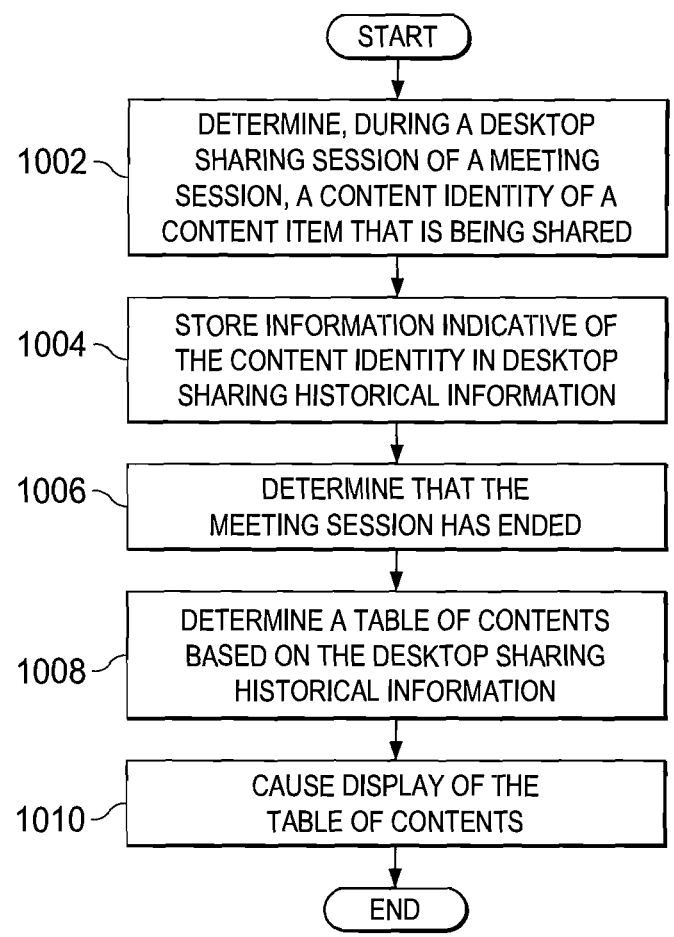
FIG. 10 is a flow diagram illustrating activities associated with desktop sharing historical information according to at least one example embodiment.

FIG. 10 is a flow diagram illustrating activities associated with desktop sharing historical information according to at least one example embodiment. In at least one example embodiment, there is a set of operations that corresponds to the activities of FIG. 10. An apparatus, for example MCS/MCC 44 of FIG. 1 and FIG. 2, or a portion thereof, may utilize the set of operations. The apparatus may comprise means, including, for example processor 84f of FIG. 2, for performing such operations. In an example embodiment, an apparatus, for example MCS/MCC 44 of FIG. 1 and FIG. 2, is transformed by having memory, for example memory element 86f of FIG. 2, comprising computer code configured to, working with a processor, for example processor 84f of FIG. 2, cause the apparatus to perform set of operations of FIG. 10.

At block 1002, the apparatus determines, during a desktop sharing session of a meeting session, a content identity of a content item that is being shared, similarly as described regarding block 702 of FIG. 7. At block 1004, the apparatus stores information indicative of the content identity in desktop sharing historical information, similarly as described regarding block 704 of FIG. 7. At block 1006, the apparatus determines that the meeting session has ended. At block 708, the apparatus determines a post-meeting representation of the desktop sharing historical information, similarly as described regarding block 706 of FIG. 7.

At block 1008, the apparatus determines a table of contents based, at least in part, on the desktop sharing historical information. The determination and the table of contents may be similar as described regarding FIGS. 4A-4D, FIGS. 5A-5C, and/or the like.

At block 1010, the apparatus causes display of the table of contents. The causation of display may be similar as described regarding block 710 of FIG. 7.

Figure 11:
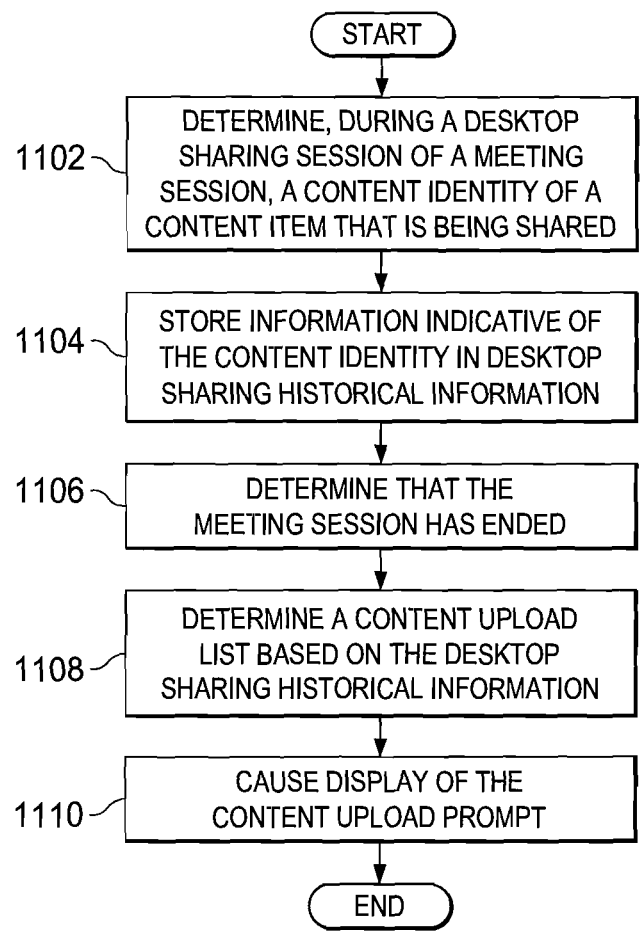
FIG. 11 is a flow diagram illustrating activities associated with desktop sharing historical information according to at least one example embodiment.

FIG. 11 is a flow diagram illustrating activities associated with desktop sharing historical information according to at least one example embodiment. In at least one example embodiment, there is a set of operations that corresponds to the activities of FIG. 11. An apparatus, for example MCS/MCC 44 of FIG. 1 and FIG. 2, or a portion thereof, may utilize the set of operations. The apparatus may comprise means, including, for example processor 84f of FIG. 2, for performing such operations. In an example embodiment, an apparatus, for example MCS/MCC 44 of FIG. 1 and FIG. 2, is transformed by having memory, for example memory element 86f of FIG. 2, comprising computer code configured to, working with a processor, for example processor 84f of FIG. 2, cause the apparatus to perform set of operations of FIG. 11.

At block 1102, the apparatus determines, during a desktop sharing session of a meeting session, a content identity of a content item that is being shared, similarly as described regarding block 702 of FIG. 7. At block 1104, the apparatus stores information indicative of the content identity in desktop sharing historical information, similarly as described regarding block 704 of FIG. 7. At block 1106, the apparatus determines that the meeting session has ended. At block 708, the apparatus determines a post-meeting representation of the desktop sharing historical information, similarly as described regarding block 706 of FIG. 7.

At block 1108, the apparatus determines a content upload list, at least in part, on the desktop sharing historical information. The determination and the content upload list may be similar as described regarding FIGS. 4A-4D, FIGS. 5A-5C, and/or the like.

At block 1010, the apparatus causes display of the content upload list. The causation of display may be similar as described regarding block 710 of FIG. 7.

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and may accommodate a large number of rooms and sites, as well as more complicated/sophisticated arrangements and configurations. Accordingly, the examples provided herein should not limit the scope or inhibit the broad teachings of communication system 10 as potentially applied to a myriad of other architectures. Additionally, although described with reference to particular scenarios where MCSs/MCC 44 resides in a particular physical location, MCSs/MCC 44 may reside in any location, provided it has some connectivity to a suitable network.

It is also important to note that the steps discussed with reference to FIGS. 1-9 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in WebEx and Meeting Place conferencing environments or arrangements, the present disclosure may be used in any online environment that could benefit from such technology. For example, in certain instances, computers that are coupled to each other in some fashion may utilize the teachings of the present disclosure (e.g., even though participants would be in a face-to-face arrangement). Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method, comprising:
   receiving, by a server from an endpoint, data corresponding to a desktop sharing session of a meeting session, wherein the data comprises image data representative of a plurality of applications displayed on the endpoint;
   executing, by the server, an image processing function on the image data to identify which application of the plurality of applications is a current focus of the endpoint;
   identifying, by the server based on the image data, a graphical representation of a content identity of a content item that is being shared within the application;
   storing, by the server, information indicative of the content identity in desktop sharing historical information, wherein the desktop sharing historical information comprises a data structure that correlates the information with a timestamp identifying a relative time at which the content item was shared in the meeting session;
   determining, by the server, that the meeting session has ended;

generating, by the server, a post-meeting representation of the desktop sharing historical information, wherein the post-meeting representation comprises a graphical user interface that identifies the content item based on the information indicative of the content identity; and transmitting, by the server, the post-meeting representation of the desktop sharing historical information to at least one endpoint associated that was involved in the meeting session.

2. The method of claim 1, further comprising:
determining time information associated with the content item being shared; and
storing the time information in the desktop sharing historical information.

3. The method of claim 1, wherein a portion of the content item, that is less than the entirety of the content of the content item, is being shared, and further comprising:
determining a portion index of the portion of the content item that is being shared; and
storing the portion index in the desktop sharing historical information.

4. The method of claim 1, further comprising:
determining a liveliness rating associated with the portion index; and
storing the liveliness rating in the desktop sharing historical information.

5. The method of claim 4, wherein the liveliness index relates to a measurement of amount of user input events during sharing of the content item in relation to the content item.

6. The method of claim 1, wherein the determining the content identity comprises a query to at least one of an operating system interface, a program interface, or a library interface, to retrieve the content identity.

7. The method of claim 1, wherein the post-meeting representation relates to a table of contents of the meeting.

8. An apparatus comprising at least one processor and at least one memory, the at least one memory including computer program instructions that, when executed by the at least one processor, cause the apparatus to:
receive, from an endpoint, data corresponding to a desktop sharing session of a meeting session, wherein the data comprises image data representative of a plurality of applications displayed on the endpoint;
execute an image processing function on the image data to identify which application of the plurality of applications is a current focus of the endpoint;
identify, based on the image data, a graphical representation of a content identity of a content item that is being shared within the application;
store information indicative of the content identity in desktop sharing historical information, wherein the desktop sharing historical information comprises a data structure that correlates the information with a timestamp identifying a relative time at which the content item was shared in the meeting session;
determine that the meeting session has ended;
generate a post-meeting representation of the desktop sharing historical information, wherein the post-meeting representation comprises a graphical user interface that identifies the content item based on the information indicative of the content identity; and
transmit the post-meeting representation of the desktop sharing historical information to at least one endpoint associated that was involved in the meeting session.

9. The apparatus of claim 8, wherein the memory further includes computer program instructions that, when executed by the at least one processor, cause the apparatus to:
determine time information associated with the content item being shared; and
store the time information in the desktop sharing historical information.

10. The apparatus of claim 8, wherein a portion of the content item, that is less than the entirety of the content of the content item, is being shared, and wherein the memory further includes computer program instructions that, when executed by the at least one processor, cause the apparatus to:
determine a portion index of the portion of the content item that is being shared; and
store the portion index in the desktop sharing historical information.

11. The apparatus of claim 8, wherein the memory further includes computer program instructions that, when executed by the at least one processor, cause the apparatus to:
determine a liveliness rating associated with the portion index; and
store the liveliness rating in the desktop sharing historical information.

12. The apparatus of claim 11, wherein the liveliness index relates to a measurement of amount of user input events during sharing of the content item in relation to the shared content item.

13. The apparatus of claim 8, wherein the determination of the content identity comprises a query to at least one of an operating system interface, a program interface, or a library interface, to retrieve the content identity.

14. The apparatus of claim 8, wherein the post-meeting representation relates to a table of contents of the meeting.

15. The apparatus of claim 8, wherein the post-meeting representation relates to a content item upload list that comprises, at least, a content item entry that represents the content item.

16. A non-transitory computer readable medium comprising instructions that, when executed, cause an apparatus to:
receive, from an endpoint, data corresponding to a desktop sharing session of a meeting session, wherein the data comprises image data representative of a plurality of applications displayed on the endpoint;
execute an image processing function on the image data to identify which application of the plurality of applications is a current focus of the endpoint;
identify, based on the image data, a graphical representation of a content item that is being shared within the application;
store information indicative of the content identity in desktop sharing historical information, wherein the desktop sharing historical information comprises a data structure that correlates the information with a timestamp identifying a relative time at which the content item was shared in the meeting session;
determine that the meeting session has ended;
generate a post-meeting representation of the desktop sharing historical information, wherein the post-meeting representation comprises a graphical user interface that identifies the content item based on the information indicative of the content identity; and
transit the post meeting representation of the desktop sharing historical information.

17. The non-transitory computer readable medium of claim 16, wherein the instructions further cause the apparatus to:
determine time information associated with the content item being shared; and store the time information in the desktop sharing historical information.

18. The non-transitory computer readable medium of claim 16, wherein a portion of the content item, that is less than the entirety of the content of the content item, is being shared, and wherein the instructions further cause the apparatus to:
   determine a portion index of the portion of the content item that is being shared; and
   store the portion index in the desktop sharing historical information.

* * * * *